A. St. Dizier,
Corn Harvester

No. 30,361.  Patented. Oct. 9. 1860.

Witnesses.  Inventor
Jno. Coomby  Archille St. Dizier
R. S. Spencer  per Munn & Co
  Attorneys

UNITED STATES PATENT OFFICE.

ACHILLES ST. DIZIER, OF PLAQUEMINE, LOUISIANA.

IMPROVEMENT IN CANE-HARVESTERS.

Specification forming part of Letters Patent No. 30,361, dated October 9, 1860.

*To all whom it may concern:*

Be it known that I, ACHILLES ST. DIZIER, of Plaquemine, in the parish of Iberville and State of Louisiana, have invented a new and Improved Machine for Harvesting Sugar-Cane; and I do hereby declare that the following is a full, clear, and exact description of the same, reference being had to the accompanying drawings, making a part of this specification, in which—

Figure 1:
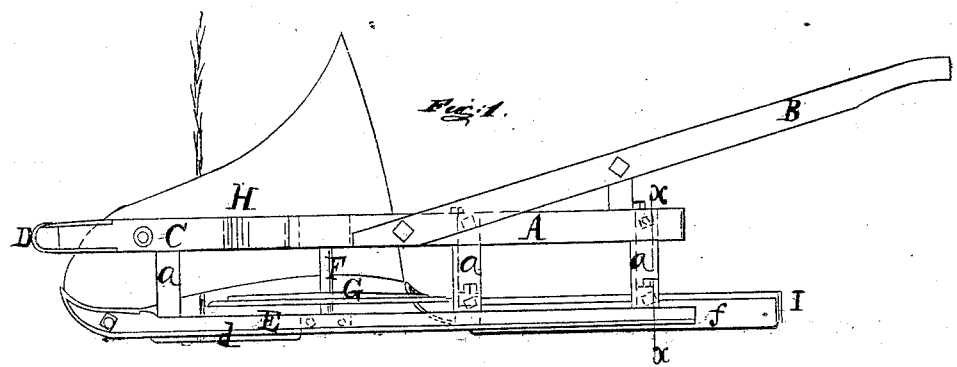
Figure 2:
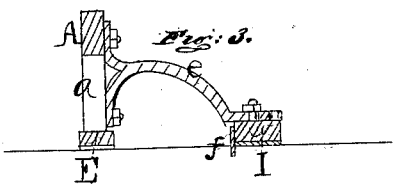
Figure 3:
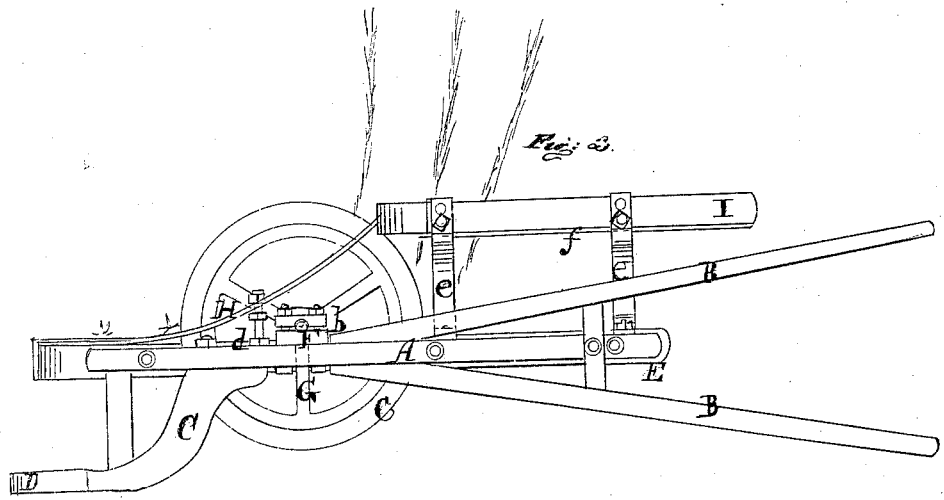

Figure 1 is a side view of my invention; Fig. 2, a plan or top view of the same; Fig. 3, a transverse section of the same, taken in the line $x$ $x$, Fig. 1.

Similar letters of reference indicate corresponding parts in the several figures.

This invention relates to a new and improved machine for cutting standing sugar-cane and depositing it, as cut, in windrows parallel with the rows in which it grew.

The invention consists in the employment or use of a rotating cutter in connection with a mold-board and guide-plates, all being attached to a suitable frame, and arranged in such a manner as to constitute a very simple, efficient, and economical machine for the desired purpose.

To enable those skilled in the art to fully understand and construct my invention, I will proceed to describe it.

A represents a beam, to which the handles B B are attached. These handles are similar to those used on plows and analogous machines. To the front part of the beam A a bar, C, is attached, said bar projecting out laterally from the beam a certain distance and having a clevis, D, attached.

The beam A is connected by uprights $a$ to a runner, E, the front end of which is curved upward, as shown clearly in Fig. 1. Between the beam A and runner E a vertical shaft, F, is placed, said shaft being fitted in suitable bearings, $b$ $b$, and having a horizontal cutter-wheel, G, upon it, said wheel being just above the runner E, as shown clearly in Fig. 1. The wheel G may be an ordinary cast-metal wheel with an annular cutter, $c$, attached to its periphery.

To the front end of the runner E there is attached a mold-board, H, which projects out from the right-hand side of the machine and over the cutter-wheel G, as shown in Fig. 2. This mold-board extends upward a considerable distance, as shown clearly in Fig. 1. To the front part of the runner E, at its right-hand side, there is attached a vertical metal plate, $d$, which projects a short distance below the runner, as shown in Fig. 1.

To two of the uprights $a$ $a$ at the back part of the machine there are attached brackets or curved bars $e$ $e$, one to each upright. These bars project laterally from the uprights, and are of bow form, as shown clearly in Fig. 3. To the outer ends of the bars $e$ $e$ a runner, I, is attached, which is parallel with the runner E, but not so long as it. The runner I has a vertical plate, $f$, attached to its inner side, said plate projecting down a short distance below the runner I, the same as the plate $d$ of runner E. The runners E I may be of wood shod with metal.

The operation is as follows: The draft-power is attached to the clevis of bar C, and the machine is drawn along with the two runners E I at opposite sides of the row of cane being operated upon. The cutter-wheel G cuts the cane near the surface of the ground, and the mold-board H turns the cut cane off and deposits it in windrows parallel with the row in which it grew. (See red lines in Fig. 2.) The plates $d$ $f$ prevent the machine from sliding laterally as it is drawn along. These plates are an essential feature of the invention, for the machine, unless rigidly guided and kept in proper position, would be deflected out of its proper course by the action of the cutter on the cane, or, rather, in consequence of the resistance the cane offers to the action of the cutter.

I am aware that rotating cutters have been used in cane-harvesting machines, and I do not claim such device, in itself considered; but I do claim as new and desire to secure by Letters Patent—

The combination of the rotating cutter-wheel G, mold-board H, and guides or plates $d$ $f$, the latter being attached to the runners E I, and all arranged as and for the purpose herein set forth.

ACHILLES ST. DIZIER.

Witnesses:
A. G. JONES,
V. I. DUPUY.